Nov. 6, 1928.

H. O. NELSON

TRANSPORTER

Filed April 11, 1927 — 4 Sheets-Sheet 2

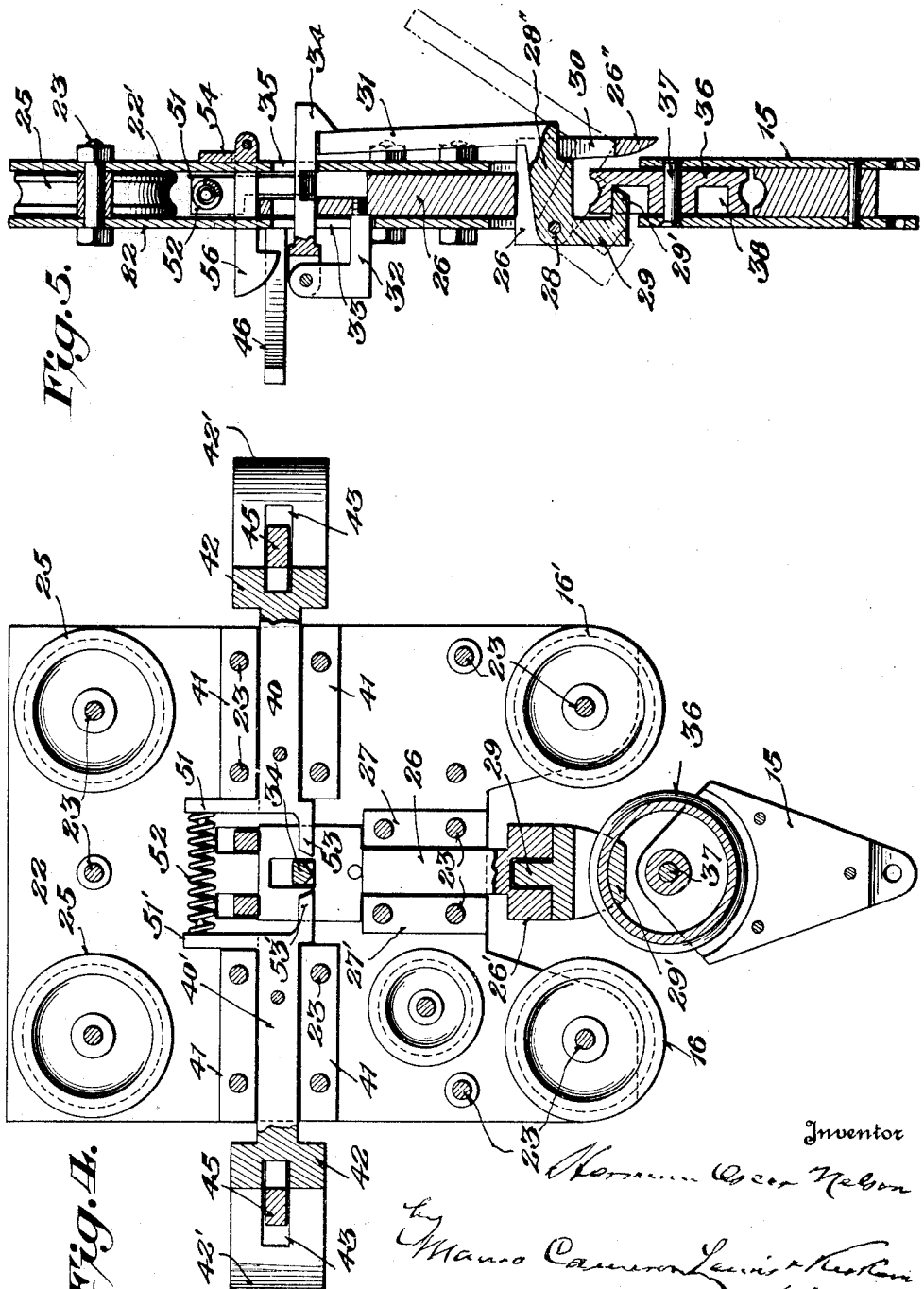

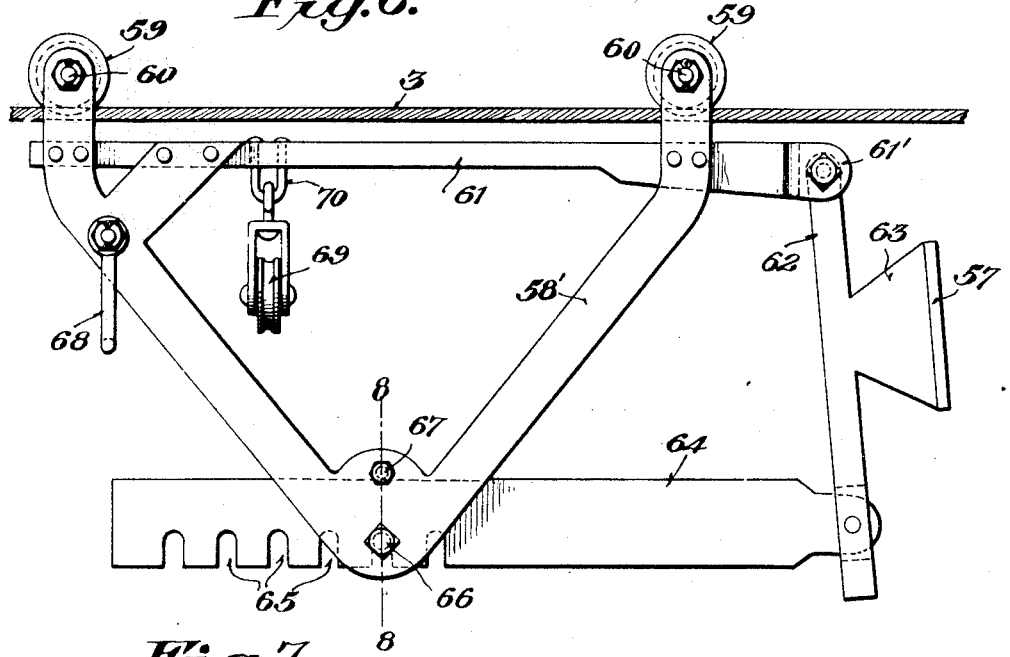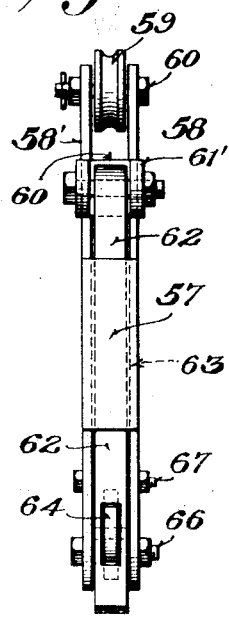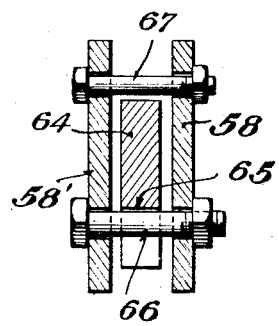

Patented Nov. 6, 1928.

1,690,454

UNITED STATES PATENT OFFICE.

HERMAN OSCER NELSON, OF DOTY, WASHINGTON.

TRANSPORTER.

Application filed April 11, 1927. Serial No. 182,875.

This invention relates to improvements for transporting loads of material along an overhead track or way from one point to another. Devices of the kind in quesiton are capable of a variety of uses, such as loading and unloading vessels, transporting logs in timbering operations, and the like.

It has heretofore been proposed to provide a carriage to travel on an overhead track or way, such, for example, as a cable suitably supported, which carriage is provided with means for automatically engaging the load carrying element to the carriage and disengaging it therefrom. The present invention has for an object to provide a carriage of this description which shall be extremely simple in its construction and thoroughly efficient in its operation, to the end that when the load carrying element is raised into position to be engaged by the carriage, it shall be certainly and securely attached thereto without intervention on the part of the operator, and which, when it reaches its destination, shall be automatically released therefrom, the releasing means also serving to secure and retain the carriage in the delivery position on the track or way until the load carrying element is again raised into operative relation with the carriage, whereupon the latter is automatically freed to make the reverse trip along the track or way. Various means have heretofore been provided for effecting these functions, and the present invention constitutes improved means whereby the certainty of operation of the device is secured, while the liability of the same to get out of order is decreased.

While, as indicated above, the invention is capable of a variety of uses, it is particularly useful in timbering operations for transporting logs from one position to another, as, for example, across a rough section of country, gulches and the like, and such use is illustrated in the accompanying drawings, in which—

Fig. 4 is a vertical section on the line 4—4 of Fig. 3, looking in the direction of the arrows;

Fig. 5 is a vertical section on the line 5—5 of Fig. 2, looking in the direction of the arrows;

Fig. 6 is a side elevation of one of the abutments or stops which serve to bring the carriage to rest and retain it at any position on the track or way to which the stop may be adjusted, and at the same time automatically trip the load supporting block to free it from the carriage;

Fig. 7 is an end elevation of Fig. 6, looking from the right; and

Fig. 8 is a cross-section on the line 8—8 of Fig. 6;

Figure 1:
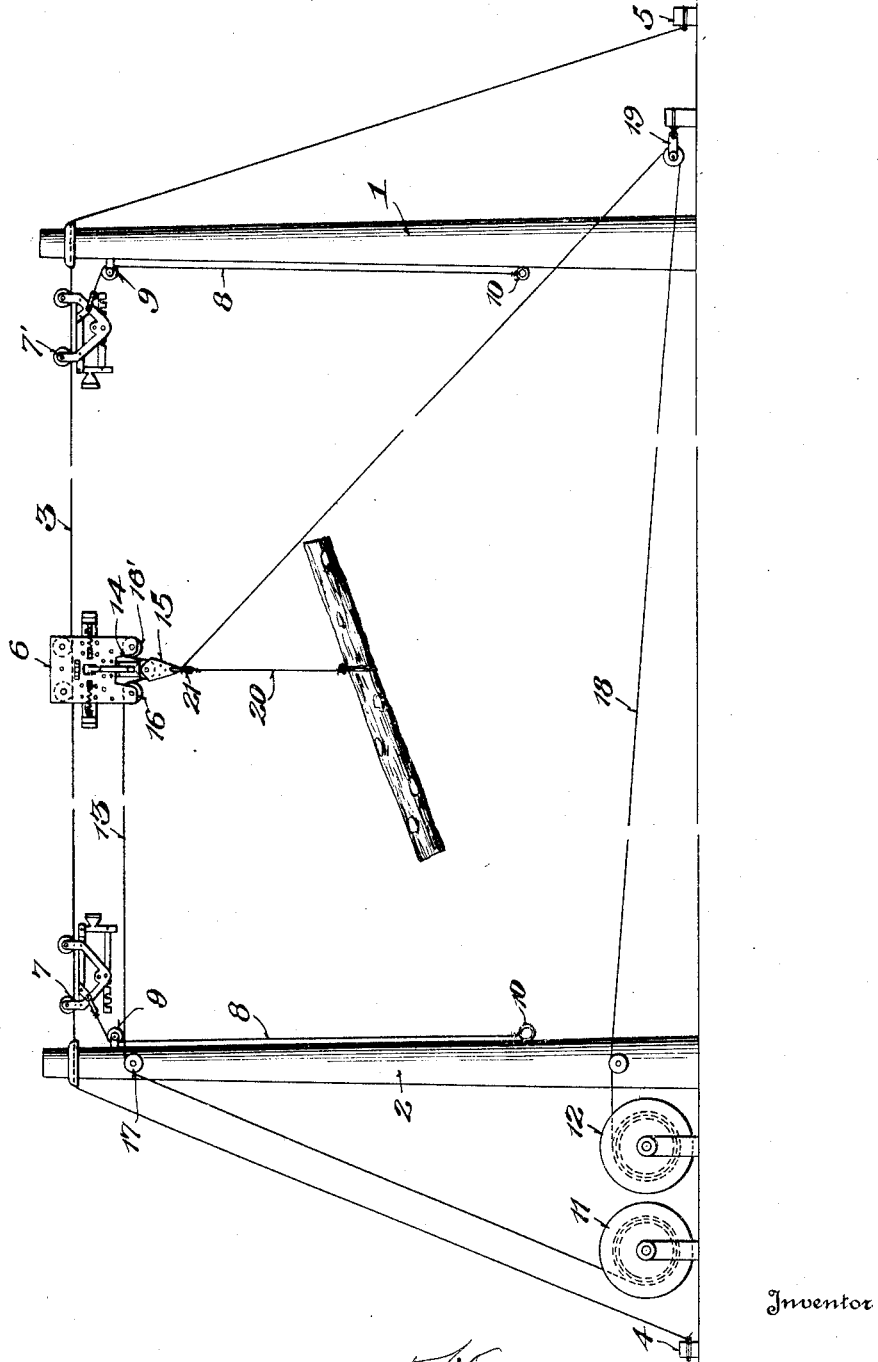
Fig. 1 is a side elevation of the apparatus in operation.

Referring to said drawings, in which like reference numerals indicate like parts throughout the several views, 1 and 2 illustrate two suitable supports, here shown in the form of spars, and which, in logging operations, may be two tree trunks, and 3 indicates a suitable track or way, here shown as a heavy wire cable, technically known as a "skyline," stretched between the spars 1 and 2. This skyline 3 is securely anchored at each end to any suitable anchor, as stumps 4 and 5; 6 is a carriage, to be hereinafter described, traveling on the skyline 3, and 7, 7' are movable abutments also carried on the skyline. As shown in Fig. 1, these abutments 7, 7' are yieldingly anchored on the skyline adjacent the spars 1 and 2, this anchoring being accomplished by means of cables 8 secured to the abutments and passing over the pulleys 9 on the spars, the lower end of the cables being secured to staples 10, 10 driven into the spars.

Located near one of the spars, as spar 2, are two drums 11 and 12 capable of being operated in either direction by a suitable engine or engines, not shown. A main line 13 is secured to the carriage 6 at the point 14, is passed through a block 15 and over a roller 16 on the carriage and a suitable roller 17 on the spar 2 and then around the drum 11. A second line 18, technically known as a "haul-back line", extends from the drum 12, adjacent the spar 2, around a pulley 19 suitably anchored adjacent the spar 1, as, for example, to a stump, and thence to the sheave block to which it is secured. A third line 20, known as the "choke line" is used to secure the load, as a log, to the sheave block 15. By winding up the main line 13 on the drum 11 the sheave block 15 is elevated until it comes in contact with the carriage, to which it is automatically secured by means hereinafter to be described. After the sheave block 15 is secured to the carriage, the drum 11 is operated to wind up the main line 13, and the drum 12 operated to unwind the haul-back line 18, and the carriage is thus advanced along the skyline 3 from right to left, as viewed in Fig. 1. When the carriage arrives at the point where the abutment 7 is secured in position on the skyline, the carriage contacts therewith and by means of mechanism, to be hereinafter described, this contact automatically frees the sheave 15 from the carriage and causes the carriage to become engaged with the abutment. The drum 11 is then operated to permit unwinding of the main line 13; and the sheave, together with the load is lowered to the ground, and the load being disengaged from the choke line 20, the drum 11 is again operated to elevate the sheave block 15 until it again comes in contact with the carriage and is automatically secured thereto. Simultaneously as the sheave block engages with the carriage, the latter is disengaged from the abutment 7 to which it has become secured when it first made contact therewith. The drums 11 and 12 are then operated to unwind the main line 13 and wind up the haul-back line 18 until the carriage makes contact with the abutment 7, on the right of Fig. 1, when it becomes automatically engaged with said abutment and simultaneously frees the sheave block 15 from the carriage. By further unwinding the main line 13 from the drum 11, the sheave is lowered and another load is secured to the choke line 20, whereupon the main line 13 is wound up on the drum 11 and the operation repeated.

The automatic engagement of the sheave block with the carriage and disengagement therefrom, and the automatic engagement and disengagement of the carriage with and from the abutments, is effected by the peculiar mechanism of the carriage which will now be described.

Figure 2:
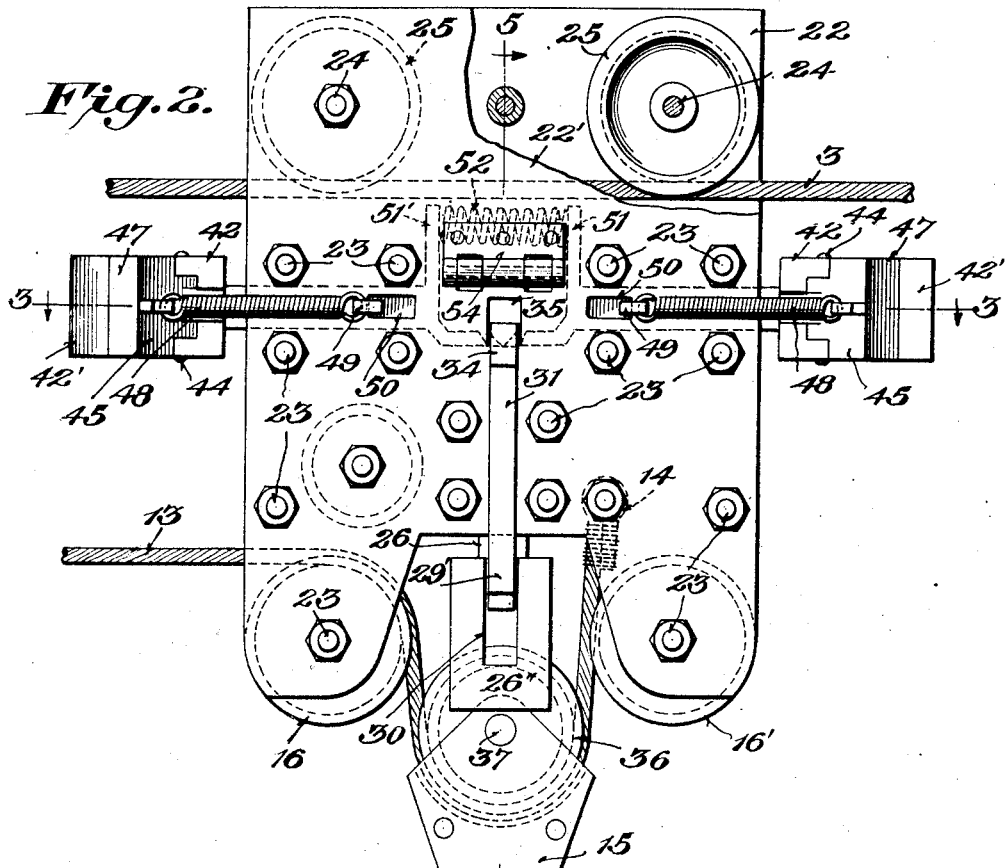
Fig. 2 is a side elevation, partly broken away, of the carriage and the load supporting block in operative engagement therewith.

Referring to Fig. 2, the carriage consists of two metal plates 22, 22' suitably spaced apart and in parallel, vertical planes, and held together by a series of bolts 23. Two of these bolts 23 are located near the top of the carriage and serve as axles for two grooved wheels 25 located between the plates, which wheels travel on the skyline 3. The two plates 22 and 22' are recessed at their bottom edges, and on either side of said recess is mounted grooved wheels 16, 16' each free to turn on one of the bolts 23 serving to secure the two plates together.

Mounted between the plates 22 and 22' is a bar 26, see Figs. 4 and 5, which is free to slide vertically in a channel formed by the plates 22, 22' and two blocks 27, 27' bolted in position between the plates. The lower end of this bar is enlarged as shown at 26' and is located in the recesses of the side plates mentioned above. Said enlargement has an offset part 26", and pivoted at 28 to the opposite side of the enlargement is a clamp member 29. This clamp member has an inwardly extending lip 29', and extending across the enlarged part 26' of the bar 26 is a portion 29" passing through a slot 30 in the portion 26", to which part 29" is rigidly secured an arm 31. The member 29, together with the lip 29' and the portion 29" and the arm 31, constitute one integral structure pivoting on the pivot 28, as will be readily understood from an inspection of Fig. 5. To the upper portion of the bar 26 there is secured an arm 32 projecting outwardly through a slot 33 in the plate 22. This arm is bent at right angles upward, as clearly shown in Fig. 5, and its upper end has pivoted thereto a catch 34, which catch extends transversely through the slot 33 and the plate 22 and through a slot 35 in the plate 22', and in a position to engage the upper end of the arm 31 when the latter is adjusted in the full line position shown in Fig. 5, the catch being held in engagement with the arm by gravity.

The sheave block 15 is provided with a sheave 36 free to turn on a shaft 37 securing the two side plates of the sheave block together. This pulley 36 has an annular recess 38 formed in one face thereof, to wit, the face that is turned towards the lip 29' on the member 29. When the sheave block is in the position shown in Fig. 5 and the parts in position shown in full lines, the sheave block is supported by the lip 29' engaging with the groove 38 in the pulley 36, and is held in this engaged position by the engagement of the catch 34 with the arm 31. It will be observed that the bar 26 carries the pivot member 29 and the catch 34, and that said bar is free to have a limited up and down movement, the extent of which is determined by the distance between the shoulders on the part 26', see Fig. 4, and the bottom of the recess formed in the plates of the carriage. In such up and down movement all of the parts secured thereto move up and down therewith and without disturbing the relation of the parts; that is, for example, without tripping the catch 34 when it is engaged with the arm 31.

Figure 3:
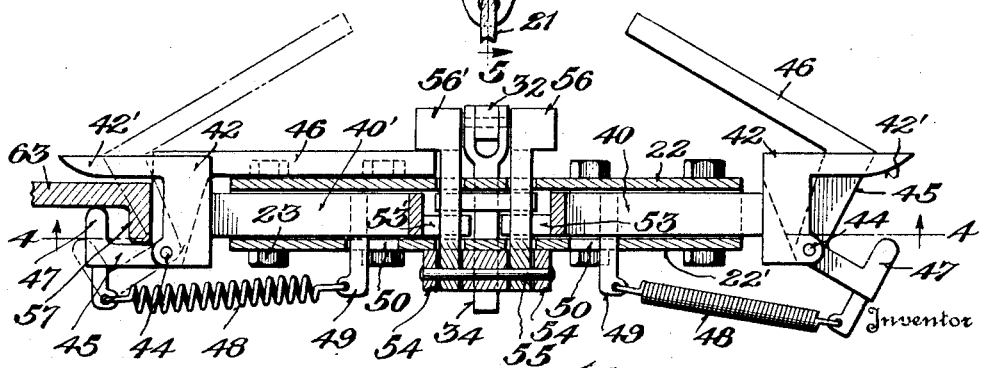
Fig. 3 is a cross-sectional view on the line 3—3 of Fig. 2, looking in the direction of the arrows.

Arranged to slide horizontally between the two plates 22, 22' are two bars 40, 40', Fig. 4, the channels in which the bars slide being formed by metal blocks 41 secured between the plates 22, 22' by bolts passing through the plates and the bars, as will be readily understood from an inspection of Figs. 2 and 4. As the construction of these two bars is exactly identical, a description of one of them will be sufficient. The outer end 42 of the bar is enlarged and has a transverse, horizontal slot 43 formed therein. Pivoted to the enlarged head, and to one side of said slot, as at 44, Fig. 3, is a bell-crank-lever 45, one arm of which extends transversely through the slot 43 in the member 42, and has an arm 46 extending at right angles thereto, as will be clearly understood from an inspection of Fig. 3. The other arm of said bell-crank-lever has an inwardly extending lip 47, and a spring 48 has one end secured to said bell-crank-lever adjacent the lip 47, and the other end secured to an arm 49 extending from the bar 40 outward through a slot 50 formed in the plate 22'. The tension of the spring 48 tends to rock the bell-crank-lever 45 on its pivot 44 so as to throw the parts in the full line position shown to the right of Fig. 3. When, however, the arm 45 is depressed into position parallel with the plate 42 (see full line position to the left of Fig. 3) the lip 47 on the bell-crank-lever extends inwardly.

Referring now to Fig. 4, the inner ends of the two bars 40, 40' are provided with upwardly projecting shoulders 51, 51' and a strong spring 52 reacts between these shoulders, throwing the two bars outward until the shoulders 51, 51' contact with the inner ends of the bars 41, forming slideways for the bars 40, 40'. The two bars 40, 40' have on their lower edges, and extending inward toward each other, beveled lugs 53, 53'. The inner beveled ends of these lugs are adjacent to the lower edge of the catch 34, but are normally held out of contact therewith by the spring 52. The length of each of the bars 40, 40' is such that an inward pressure on the bars sufficient to overcome the tension of the spring 52 forces the bar inward for a distance sufficient to cause the beveled end to engage the beveled lower side of the catch 34 and elevate the same, thereby lifting the catch and, if the latter is in engagement with the arm 31, freeing the latter. This will permit the member 29 to rock by gravity on the pin 28, throwing the same into the dotted line position shown in Fig. 5, gravity action being due to the fact that the greater portion of the metal is at the right of the pivot pin 28.

Extending outward from the side of the plate 22' are a pair of lugs 54, Fig. 3, between which, on a pin 55, are pivoted two catches 56, 56', the shanks of the catches extending through slots in the plates 22, 22', with the beveled ends of the catches in position to engage the arms 46 when the latter extend parallel to the plate 22, as shown in full lines to the left of Fig. 3. These two catches 56, 56' extend transversely through the carriage just above the upper end of the vertical slide bar 26, and in such position that when the slide bar is moved upward it lifts both of the catches, thereby freeing either of the arms 46 that may be engaged thereby. These catches 56 and 56' act under the influence of gravity to again drop into their lowermost position as soon as the slide bar 26 is lowered. Referring now to the right hand end of Fig. 3, if inward pressure be brought to bear on the face of the bell-crank-lever 45, it will rock said lever on its pivot against the tension of the spring 48, throwing the lip 47 inward towards the part 42' and the arm 46 into a position parallel to the plate 22, which arm, contacting with the bevel face of the catch 56, will raise the catch until it passes behind the shoulder of the catch when the latter will drop and hold the arm with the bell-crank-lever in the position shown in full lines to the left of Fig. 3. This inward pressure on the bell-crank-lever 45 is effected when the carriage comes in contact with either one of the abutments 7 or 7'.

These abutments are provided with a suitable shouldered part 57 which, when the carriage comes in contact with the abutment, enters between the lip 47, and the opposite face of the part 42' contacts with the face of the bell-crank-lever 45 and turns it on its fulcrum until it assumes the position shown in full lines to the left of Fig. 3. Farther movement of the carriage presses the bar 40 or 40', as the case may be, inward and lifts the catch 34 to free the arm 31.

For the purpose of retaining the carriage in a position adjacent to the abutment, the latter is provided with the shoulder 57 opposite the lip 47 on the bell-crank-lever 45, and when the latter is rocked so as to bring the arm 46 parallel with the face of the carriage, the carriage is held in position by engagement of these parts.

The abutment may assume a variety of forms and may be anchored to the skyline in a variety of ways. In Figs. 6, 7 and 8 there is shown a preferred form consisting of two oppositely disposed V-shaped plates 58, 58' having rollers 59 mounted between them at their upper ends on axles 60 in the form of bolts extending between the two plates. These rollers travel on the skyline 3. A bar 61 is bolted between the plates 58 and 58' immediately beneath the skyline, and to one end of this bar is pivoted a downwardly extending lever 62 provided with a plate 63. Extending laterally at right angles to plate 63 is the shoulder 57 before referred to, see Figs. 3 and 6. Pivoted to the lower end of the lever 62 is a horizontally extending bar 64 having a series of notches 65 formed in the lower edge thereof, which notches engage a pin 66 in the form of a bolt extending through the plates 58, 58'. The position of the lever 62 and with it the inclination of the shoulder 57 can be adjusted, depending upon which one of the notches 65 engages the pin 68; and when the desired adjustment is attained, it is retained in the adjusted position against accidental displacement by a bolt 67 extending through the plates 58, 58' immediately above the bar 64, as will be readily understood from an inspection of Figs. 6, 7 and 8. This matter of the adjustment of the angle of inclination is important. The skyline 3 in actual practice is not horizontal. The skyline is lowest near the center, and as the carriage approaches an abutment it travels up an incline and hence the abutting shoulder should be inclined at an angle to the perpendicular to secure the best results. On a portion of the abutment adjacent to the spar is provided a ring 68, see Fig. 6, to which the cable 8 may be secured when it is desired to anchor the abutment on the skyline 3 in the manner shown in Fig. 1, as hereinbefore described. In some cases, however, it is found desirable to anchor the abutment some distance from the spar and so it can only have a limited movement on the skyline, this limited movement being essential in order that the abutment may act yieldingly to bring the carriage to a stop without too great a strain on the parts.

Referring now to Fig. 6, 69 is a pulley supported as at 70 from the cross-bars 61 of the abutment. By passing a suitable cable over this pulley 69 and securely anchoring its ends, as to stumps on opposite sides of the skyline, the abutment may be held in position on the skyline so as to be capable of only a limited movement thereon.

*Operation.*—Let it be assumed that the load is secured to the choke line 20 on the sheave block 15 and that the latter has been elevated by the main line 13 until the pulley 36 contacts with the inner lower face of the part 29, which latter is in the position shown in dotted lines in Fig. 5. This will result in rocking the part 29 on its pivot 28, thereby throwing the lip 29' into the groove 38 of the sheave 36, and throwing the arm 31 inward substantially parallel with the face of the carriage, in which movement it will engage the bevel face of the catch 34 and lift the same until the arm passes the bevel face, when said catch will drop and engage the arm 31, thereby securing the sheave block and with it the load carried thereby to the carriage. The continued upward movement of the sheave block will impart an upward movement to the bar 26, lifting the catches 56, 56' and thereby permitting the bell-crank-levers 45 to assume the position shown in dotted lines to the left of Fig. 3. Continued winding up of the main line 13 on the drum 11 will then cause the carriage to advance from right to left, Fig. 1, the haul-back line 18 being at the same time paid out from the drum 11 as previously described. When the carriage reaches the position of the abutment 7, the shouldered part 57 of said abutment will enter between the part 42' and the lip 47 and engage the face of the bell-crank-lever 45, rocking said bell-crank-lever on its pivot and throwing the lip 47 in front of the shoulder 57 on the abutment, and throwing the arm 46 on the bell-crank-lever 45 into position substantially parallel with the face of the carriage where it will be engaged by one of the catches 56, 56', this movement of the bell-crank being effected against the tension of the spring 48. The continued movement of the carriage after the members have assumed this position will force the bar 40 inward, causing the beveled shoulder 53 on said bar to pass under the bevel of the catch 34 lifting it and freeing the arm 31. By reason of the weight carried on lip 29', the element 29 may rock on its lever 28, thus freeing the sheave block and permitting it to fall when the main line 13 is unwound from the drum 11. The log being released from the choke line, the main line is again wound up on the drum 11 until the sheave block is again lifted into position to engage the element 29, rocking it so as to throw the arm 31 into engagement with the catch 34. Further elevation of the sheave block, through the pull on the main line 13, serves to impart an upward thrust to the bar 26, thereby lifting the catches 56, 56' and freeing the lip 47 from the lip 57. In this position of the parts, the haul-back line is wound upon the drum 12, and the main line is paid out from the drum 11 and the carriage is returned from the position on the left of Fig. 1 to the position on the right thereof, and when it comes in contact with the abutment 7', the sheave block is freed in the precise manner just described in connection with the abutment 7, whereupon the main line is further paid out and the sheave block lowered, and another load, as a second log, secured thereto and the operation repeated.

In actual logging operations, these parts are made very heavy and very strong. The carriage, for example, weighs approximately a ton, while the two abutments weigh approximately 600 pounds. It will be perceived that all of the parts are extremely simple in construction and operation, are capable of being made very strong so as to withstand the severe duties to which they are put in operation, that they effect their functions automatically, while serving to hold the heavy loads carried with absolute security, thus reducing to a minimum the danger involved in their operation.

While one illustrative embodiment of the inventive idea has been described herein in detail, it will be understood that the scope of the invention is not limited to such embodiment, or otherwise than by the terms of the appended claims.

What is claimed is:

1. In a device of the character described, the combination of a track or way, an abutment at either end thereof, a carriage mounted to travel on said track or way, and a sheave block supported by said carriage, said carriage having two oppositely disposed, horizontally sliding members each with an abutment-engaging shoulder on its outwardly extending end, a downwardly extending sliding member having a sheave block supporting shoulder on its lower end, catches for retaining the several shoulders in engaging relation, means actuated by the downwardly extending sliding member for tripping the catches of the abutment-engaging shoulders, and means actuated by the horizontally sliding members for tripping the catch of the sheave block engaging shoulder.

2. In a device of the character described, the combination of a track or way, a carriage mounted to travel thereon, a vertically movable slide bar on said carriage and projecting downward therefrom, said bar having an offset on its lower end, a shouldered member pivoted to said bar on the opposite side from said offset and having a part extending transverse to said bar and through a slot in said offset, an arm secured to said part, a catch for engaging said arm, and a sheave block engaging said transversely extending part to rock said shouldered member into engagement with said catch and with a shoulder on said sheave block.

3. In a device of the character described, a carriage, two horizontally disposed oppositely extending slides carried thereby and each having an end projecting therefrom, a shouldered member pivoted to each projecting end and having a part extending transversely thereto, a pair of oppositely disposed shouldered abutments in the path of said carriage in a position to be engaged by said transversely extending part to rock said shouldered members on their pivots, whereby the shoulders on said members and said abutments may be interlocked, catches for retaining said parts in interlocking position, and sheave block actuated means for freeing said catches.

4. In a device of the character described, a carriage, a horizontally extending slide carried thereby, a spring normally holding said slide in its outermost position, a shouldered part pivoted on the outer end of said slide and extending across the same, a gravity actuated catch for engaging said shouldered part, a spring tending to throw said part against the resistance of said catch, and a sheave block actuated slide for lifting said catch.

5. In a device of the character described, a carriage comprising two spaced vertical parallel plates, two oppositely disposed abutment clamps slidably mounted between said plates, catches for retaining the same in clamping position, a sheave block clamp also slidably mounted between said plates, a catch for retaining the same in clamping position, said abutment clamp catches being released by the sliding movement of the sheave block clamp, and the sheave block catches being released by the sliding movement of either of the abutment clamps.

6. In a device of the character described, a carriage comprising a pair of spaced vertically disposed parallel plates, a pair of oppositely disposed horizontally sliding abutment clamp members, a spring reacting between said members, a pivoted jaw on each clamp member, springs for opening said jaws, a catch for each jaw to hold the same closed, and a sheave block actuated member for tripping said catches.

7. In a device of the character described, a pair of spaced vertically disposed parallel plates, a vertically disposed sliding sheave block clamp member, a pivoted jaw on said clamp member opened by gravity, a catch for holding said jaw closed, two oppositely disposed abutment actuated slides, a spring reacting between said two slides, the inner end of each of said slides being in operative relation with said catch to trip the same on an inward movement of the slide.

8. In a device of the character described, the combination of a track or way, two oppositely disposed yielding abutments, a carriage mounted to travel on said track or way, and a load-supporting sheave block carried by said carriage, with a catch pivoted to said carriage to turn in the plane at right angles to the line of movement of the carriage and securing said sheave block in supporting engagement with the carriage, and two oppositely disposed horizontally sliding bars engaged by the respective abutments and tripping said catch to free said sheave block.

9. In a device of the character described, the combination of a track or way, an abutment thereon, a carriage mounted to travel on said track or way and a sheave-block with means for elevating said sheave-block into engagement with said carriage, a catch for securing said sheave-block to the carriage, a catch for securing the carriage to said abutment, and a slide operated by the said sheave-block, said slide successively closing said first-named catch and tripping said last-named catch.

In testimony whereof I have signed this specification.

HERMAN OSCER NELSON.